United States Patent
Couleaud et al.

(10) Patent No.: US 10,893,318 B2
(45) Date of Patent: Jan. 12, 2021

(54) AIRCRAFT ENTERTAINMENT SYSTEMS WITH CHATROOM SERVER

(71) Applicant: Thales Avionics, Inc., Irvine, CA (US)

(72) Inventors: Jean-Yves Couleaud, Mission Viejo, CA (US); Jerry Thomas, Mission Viejo, CA (US)

(73) Assignee: Thales Avionics, Inc., Irvine, CA (US)

( * ) Notice: Subject to any disclaimer, the term of this patent is extended or adjusted under 35 U.S.C. 154(b) by 58 days.

(21) Appl. No.: 16/418,459

(22) Filed: May 21, 2019

(65) Prior Publication Data
US 2019/0273964 A1  Sep. 5, 2019

Related U.S. Application Data

(63) Continuation-in-part of application No. 15/864,535, filed on Jan. 8, 2018, now Pat. No. 10,306,294, which
(Continued)

(51) Int. Cl.
*H04N 21/431* (2011.01)
*G06K 9/00* (2006.01)
(Continued)

(52) U.S. Cl.
CPC ..... *H04N 21/4316* (2013.01); *G06K 9/00268* (2013.01); *G06K 9/00302* (2013.01);
(Continued)

(58) Field of Classification Search
CPC ......... H04N 21/4316; H04N 21/41422; H04N 7/183; H04N 21/812; H04N 21/4668;
(Continued)

(56) References Cited

U.S. PATENT DOCUMENTS

| 5,715,415 A | 2/1998 | Dazey et al. |
| 2006/0184800 A1 | 8/2006 | Rosenberg |

(Continued)

OTHER PUBLICATIONS

Sooryaprakash Pandey, Suraj More, Rachna More—Artificial Intelligence Based Chat-Bot, Sep. 2018,International Journal of Research in Engineering, Science and Management vol. 1, Issue—9, Sep. 2018 (Year: 2018).*

(Continued)

*Primary Examiner* — Hai V Tran
(74) *Attorney, Agent, or Firm* — Sage Patent Group

(57) ABSTRACT

A vehicle chatroom server includes at least one network interface configured to communicate with passenger terminals, at least one processor connected to communicate through the at least one network interface, and at least one memory storing code that is executed by the at least one processor to perform operations. The operations include obtaining passenger information and characterizing potential passenger discussion interests based on the passenger information. The operations identify a grouping of passengers who satisfy a common interest rule based on the potential passenger discussion interests. The operations then communicate with passengers in the grouping through a computerized chatbot module providing natural-language text and/or computer synthesized speech that is provided to the passengers in the grouping to invite to a discussion-focused chatroom hosted by the chatroom server. Related methods and computer program products are disclosed.

20 Claims, 10 Drawing Sheets

Related U.S. Application Data is a continuation of application No. 14/751,963, filed on Jun. 26, 2015, now abandoned.

(51) Int. Cl.
| | |
|---|---|
| *H04N 21/414* | (2011.01) |
| *H04N 7/18* | (2006.01) |
| *H04N 21/81* | (2011.01) |
| *H04N 21/466* | (2011.01) |
| *H04N 21/482* | (2011.01) |
| *H04N 21/485* | (2011.01) |
| *H04N 21/422* | (2011.01) |
| *H04N 21/45* | (2011.01) |
| *H04N 21/258* | (2011.01) |
| *H04N 21/4223* | (2011.01) |
| *H04N 21/214* | (2011.01) |
| *H04H 60/65* | (2008.01) |
| *H04H 60/33* | (2008.01) |
| *H04H 20/62* | (2008.01) |
| *H04H 60/46* | (2008.01) |

(52) U.S. Cl.
CPC ..... *G06K 9/00315* (2013.01); *G06K 9/00832* (2013.01); *H04H 20/62* (2013.01); *H04H 60/33* (2013.01); *H04H 60/46* (2013.01); *H04H 60/65* (2013.01); *H04N 7/183* (2013.01); *H04N 21/2146* (2013.01); *H04N 21/25883* (2013.01); *H04N 21/41422* (2013.01); *H04N 21/4223* (2013.01); *H04N 21/42201* (2013.01); *H04N 21/4532* (2013.01); *H04N 21/4668* (2013.01); *H04N 21/4825* (2013.01); *H04N 21/4858* (2013.01); *H04N 21/812* (2013.01)

(58) Field of Classification Search
CPC ........... H04N 21/4825; H04N 21/4858; H04N 21/42201; H04N 21/4532; H04N 21/25883; H04N 21/4223; H04N 21/2146; H04H 60/46; H04H 60/65; H04H 60/33; H04H 20/62; G06K 9/00315; G06K 9/00268; G06K 9/00302; G06K 9/00832

See application file for complete search history.

(56) References Cited

U.S. PATENT DOCUMENTS

| | | | |
|---|---|---|---|
| 2009/0138805 A1 | 5/2009 | Hildreth | |
| 2010/0131983 A1 | 5/2010 | Shannon et al. | |
| 2011/0029998 A1* | 2/2011 | Yip | H04N 21/812 725/14 |
| 2012/0083668 A1 | 4/2012 | Pradeep et al. | |
| 2013/0063612 A1 | 3/2013 | Royster et al. | |
| 2014/0026156 A1 | 1/2014 | Deephanphongs | |
| 2018/0302349 A1* | 10/2018 | Ban | H04L 51/04 |
| 2020/0097221 A1* | 3/2020 | Matsumoto | H04L 51/32 |
| 2020/0099642 A1* | 3/2020 | Mishima | G06F 3/126 |

OTHER PUBLICATIONS

Deloitte, Rajarshi Sengupta, Shankar Lakshman—Conversational Chatbots—Let's chat Jun. 2017 (Year: 2017).*

* cited by examiner

AIRCRAFT ENTERTAINMENT SYSTEMS WITH CHATROOM SERVER

CROSS REFERENCE TO RELATED APPLICATION

This application is a continuation in-part of U.S. patent application Ser. No. 15/864,535, filed Jan. 8, 2018, which is a continuation of U.S. patent application Ser. No. 14/751,963, filed Jun. 26, 2015, all of which are hereby incorporated by reference in their entirety for all purposes.

TECHNICAL FIELD

Embodiments described herein relate generally to electronic entertainment systems and, more particularly, to man-machine interfaces for monitoring and controlling aircraft in-flight entertainment systems.

BACKGROUND

In-flight entertainment (IFE) systems are deployed onboard aircraft to provide entertainment services for passengers in a passenger cabin. The IFE systems typically provide on-demand distribution of movie, television, audio, and gaming entertainment programming to passenger-operated electronic communication devices.

Some IFE systems provide messaging features which enable passenger-to-passenger texting using addresses that may correspond to passengers' seat numbers. A few IFE systems have extended these features to provide an onboard chatroom where group discussions among passengers are performed.

Although significant technical development and financial investment has been made by airlines to provide these advanced passenger-to-passenger communication capabilities, actual passenger usage of in-flight texting is very low and the usage of onboard chatrooms is still much lower. Improving passenger acceptance and usage of these communication capabilities is expected to result in substantial enhancement of their flight experience.

SUMMARY

Some embodiments of the present disclosure are directed to a vehicle chatroom server that includes at least one network interface configured to communicate with passenger terminals, at least one processor connected to communicate through the at least one network interface, and at least one memory storing code that is executed by the at least one processor to perform operations. The operations include obtaining passenger information and characterizing potential passenger discussion interests based on the passenger information. The operations identify a grouping of passengers who satisfy a common interest rule based on the potential passenger discussion interests. The operations then communicate with passengers in the grouping through a computerized chatbot module providing natural-language text and/or computer synthesized speech that is provided to the passengers in the grouping to invite to a discussion-focused chatroom hosted by the chatroom server.

As will be explained in detail below in the context of numerous example embodiments, various embodiments of the present disclosure are directed to increasing passenger usage of chatroom user interface (UI) communication capabilities provided by vehicle entertainment systems. More particularly, some embodiments of the present disclosure provide a computerized chatroom UI communication capability that analyzes passengers' usage of their Personal Electronic Devices (PEDs) and/or wired passenger terminals provided by a vehicle entertainment system, identifies groups of passengers who satisfy a common interest rule, and communicates with those passengers to invite them to interest-grouped chatrooms hosted by a chatroom server which can reside on the vehicle.

Other chatroom servers and related methods and computer program products according to embodiments of the invention will be or become apparent to one with skill in the art upon review of the following drawings and detailed description. It is intended that all such additional servers, methods, and computer program products be included within this description, be within the scope of the present invention, and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the disclosure and are incorporated in and constitute a part of this application, illustrate certain non-limiting embodiments of the invention. In the drawings.

DETAILED DESCRIPTION

The following detailed description discloses various non-limiting example embodiments of the invention. The invention can be embodied in many different forms and is not to be construed as limited to the embodiments set forth herein.

Various embodiments of the present disclosure may arise from the present realization that providing a same fixed user interface (UI) to all passengers may satisfy some passengers, but will not sufficiently satisfy all passengers. As passengers have become more sophisticated in their preferences, such a one-size-fits-all approach to UI layout and operation is not an optimal approach for achieving passenger satisfaction. Some passengers have a high level of computer sophistication and are more likely to desire increased complexity UIs that provide expanded capability and passenger-interaction efficient functionality. In sharp contrast, some other passengers have a lower level of computer sophistication and are more likely to desire less complex more intuitive UIs that may exhibit less passenger-interaction efficient functionality but provide greater guidance through more UIs queries and passenger responses to perform functionality.

In accordance with various embodiments disclosed herein, an IFE system is provided that includes a UI control processor that obtains attributes of an individual passenger, generates passenger metrics that characterize the individual passenger, and controls the UI of a video display unit (VDU) used by that individual passenger based on the passenger metrics.

Some additional or alternative embodiments disclosed herein are directed to increasing passenger usage of chatroom communication UI capabilities provided by vehicle entertainment systems. More particularly, some embodiments of the present disclosure provide a computerized chatroom UI communication capability that analyzes passengers' usage of their Personal Electronic Devices (PEDs) and/or wired passenger terminals provided by a vehicle entertainment system, identifies groups of passengers who satisfy a common interest rule, and communicates with those passengers to invite them to interest-grouped chatrooms hosted by a chatroom server which can reside on the vehicle.

Figure 1:
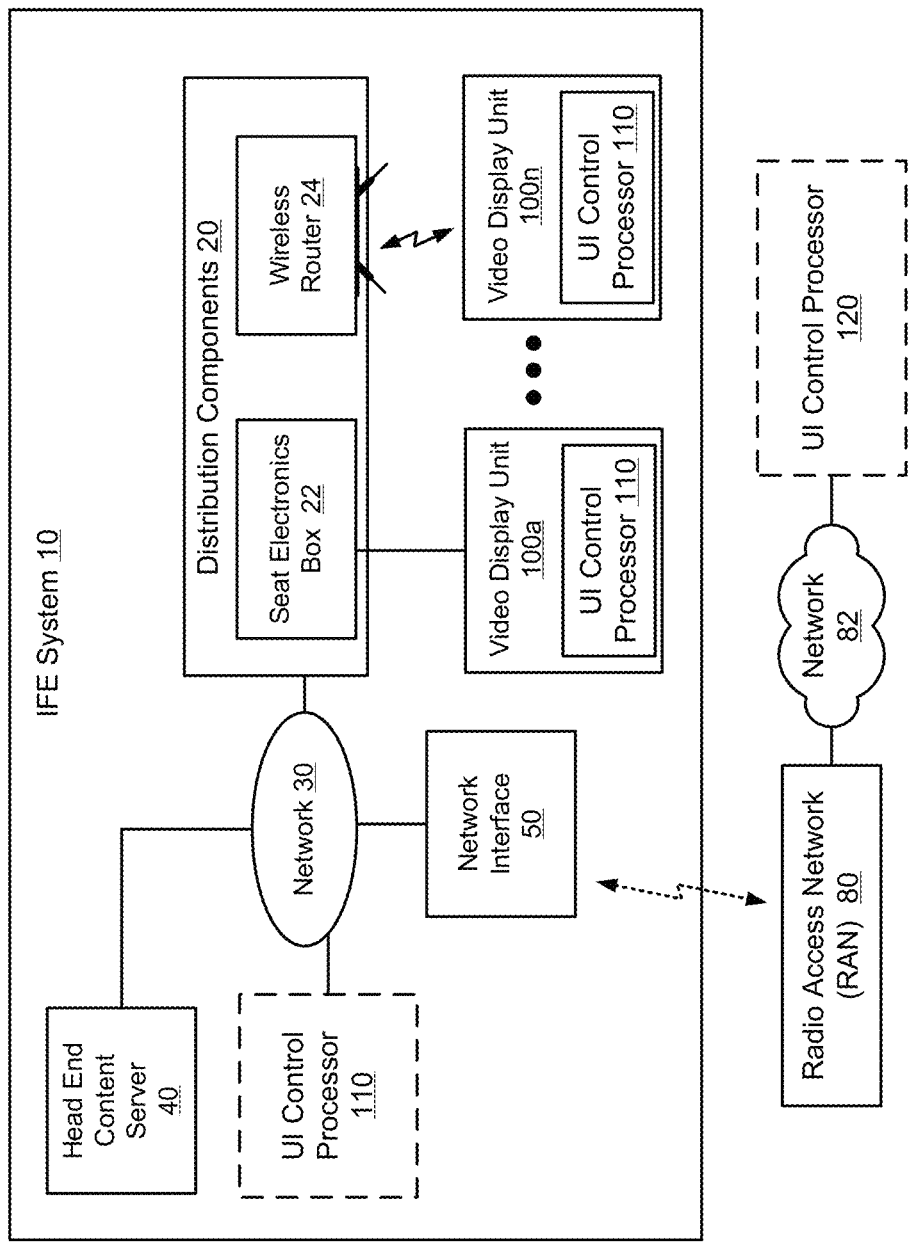
FIG. 1 illustrates a block diagram of an in-flight entertainment system that generates passenger metrics which are used to control the user interface of a video display unit (VDU) according to some embodiments.

FIG. 1 is a block diagram of an IFE system 10 that includes video display units (VDUs) 100a-n, a head end content server 40, and distribution components 20. The system 10 further includes a UI control processor 120 that may reside at least partially within each VDU 100, reside at least partially within another component of the IFE system 10 separate from the VDU 100 (e.g., within the head end content server 40 or elsewhere), and/or reside at least partially off-board the aircraft such as on a land based server. The UI control processor 120 may, for example, be incorporated within a land based server that is communicatively connected through a data network 82 (e.g., private or public network, such as the Internet), a Radio Access Network 80 (e.g., satellite communication system transceiver and/or cellular communication system transceiver) to a wireless transceiver of a network interface 50 to communicate with the VDUs 100.

Figure 2:
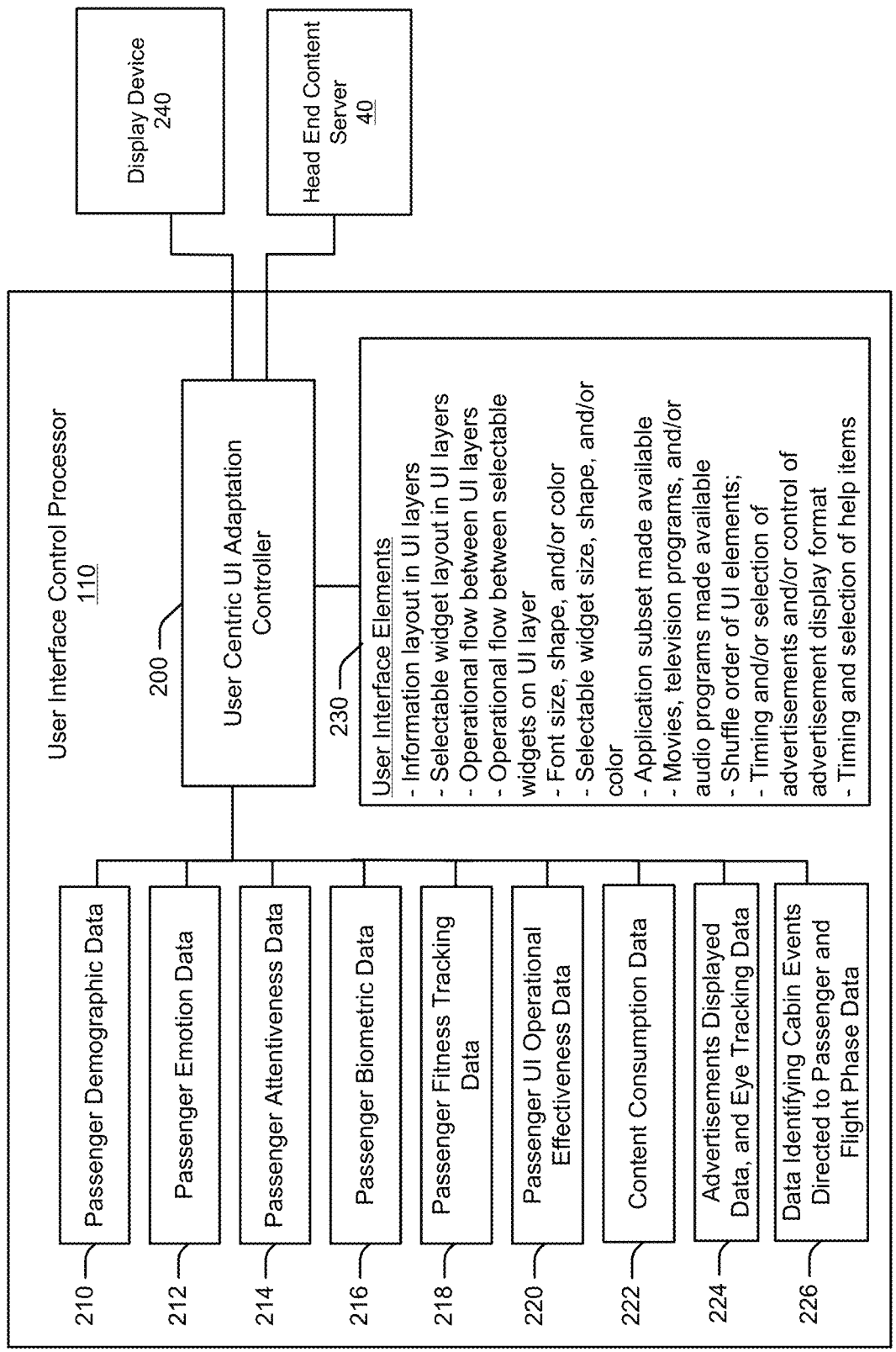
FIG. 2 illustrates example information and operations used to characterize a passenger and example operations performed to control the UI of a VDU according to some embodiments.
Figures 3, 4:
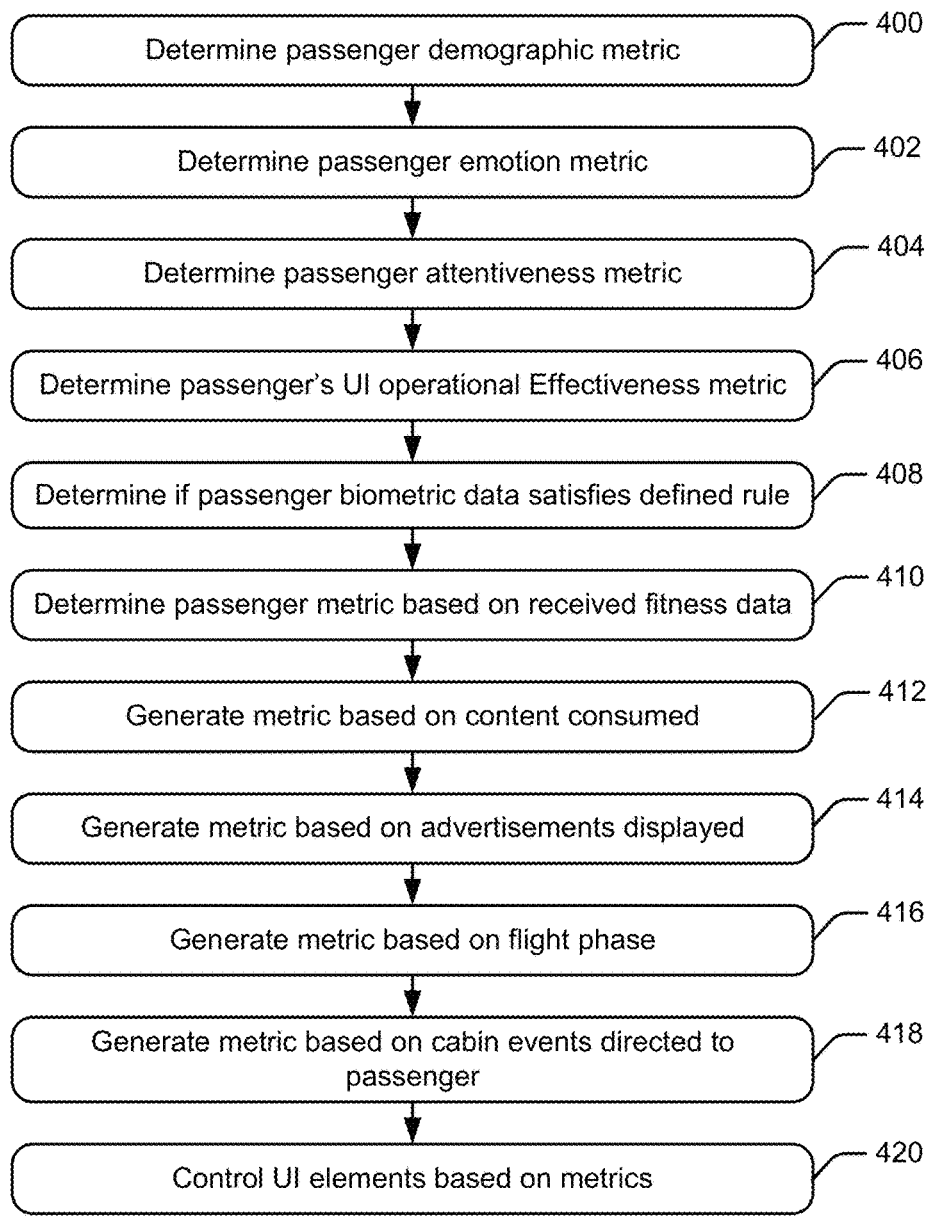
FIGS. 3-10 illustrate flowcharts of operations and methods that may be performed by a processor of a VDU, another component of the IFE, and/or a component off-board the aircraft to characterize a passenger and example operations performed to control the UI according to some embodiments.

FIG. 3 illustrates operations and methods that may be performed at least in part by the UI control processor 120. Referring to FIGS. 1 and 3, the UI control processor 120 receives (block 300) passenger attributes have been sensed. Various approaches for sensing and identifying passenger attributes are described in detail regarding FIGS. 2 and 4-11. The UI control processor 120 generates (block 302) a passenger metrics characterizing the passenger based on the attributes, and controls the UI of one of the VDUs 100 which is being operated by that passenger, based on the passenger metrics. The passenger metrics may be generated by the computerized chatroom UI communication capability analyzing passengers' usage of their PEDs, and the passenger metrics can be used to identify groups of passengers who satisfy a common interest rule, and to electronically communicate with those passengers to invite them to interest-grouped chatrooms hosted by a chatroom server which can reside on the vehicle.

The head end content server 40 stores a set of content and is configured to separately deliver content to the VDUs 100a-n responsive to content selection commands separately received from the VDUs 100a-n through a data network 30 and the distribution components 20. The distribution components 20 may include seat electronics boxes 22, each of which can be spaced apart adjacent to different groups of seats, and/or one or more wireless communication routers 24.

Example content that can be provided by the head end content server 10 to selected ones of the VDUs 100a-n can include, but is not limited to, movies, TV programs, audio programs, application programs (e.g. games, news, etc.), informational videos and/or textual descriptions (e.g., regarding destination cites, services, and products), and advertisements. The wireless router 24 may be a WLAN router (e.g. IEEE 802.11, WIMAX, etc), a cellular-based network (e.g. a pico cell radio base station), etc.

The VDUs 100a-n are connected to the head end content server 40 to request and receive content through wired and/or wireless network connections through the network 30 and/or the distribution components 20. Although only three VDUs 100a-100n and one content server 10 are shown in FIG. 1 for ease of illustration, any number of VDUs and content servers may be used with embodiments herein. Functionality described herein as being performed by the UI control processor 120 may actually be performed in part by more than one UI control processor and may involve other components, such as sensors which sense passenger attributes, personal devices of the passengers which they have carried on-board the aircraft, etc.

Although the system of FIG. 1 includes a head end content server 40, the vehicle entertainment systems disclosed herein are not limited thereto. The video display units 100a-100n may alternatively be configured to store content in internal/local mass memory for access by users and/or may stream and/or download content from other devices, such as from other video display units (e.g., peer-to-peer sharing) and/or from off-board devices such as ground based content servers accessed via a satellite and/or cellular communication system.

Although embodiments herein are primarily described in the context of an IFE system within an aircraft cabin, the invention is not limited thereto. Instead, the embodiments may be used to provide other types of vehicle entertainment systems for trains, automobiles, cruise ships, buses, and other vehicles. When used in an aircraft, a bus, a train, or other vehicles where seats are arranged in columns, the VDUs 100a-n can be attached to seatbacks so they face passengers/users in adjacent rearward seats. The VDUs 100a-n may alternatively be mounted to bulkheads, movable support assemblies connected to seat armrests and/or seat frames, etc. Embodiments herein may be used with vehicle electronic systems other than entertainments system, such as with vehicle digital signage display systems, etc. Embodiments herein may also be used for non-vehicle applications, such as within buildings, etc.

FIG. 2 illustrates example information and operations used to characterize a passenger and example operations performed to control the UI of a VDU according to some embodiments. Referring to FIG. 2, as will be explained in further detail below, the UI control processor 110 includes a user centric UI adaptation controller 200 that controls user interface elements 230 displayable on a display device 240 of the VDU 100 and/or controls content from the head end content server 40 based on passenger attribute data that is sensed by electronic sensors and characterizes one or more attributes of the passenger. The passenger attribute data can include, but is not limited to, one or more of the following: passenger demographic data 210, passenger emotion data 212, passenger attentiveness data 214, passenger biometric data 216, passenger fitness tracking data 218, passenger UI operational effectiveness data 220, content consumption data 222, displayed advertisements data 224 which may include passenger eye tracking data, and data identifying cabin events directed to the passenger and/or flight phase data 226.

The UI adaptation controller 200 controls or adapts the UI elements so that they are more optimized for use by the passenger responsive to the passenger attribute data characterizing the passenger. As will be explained in further detail below, the user interface elements 230 that can be controlled or adapted can include, but are not limited to, one or more of the following: information layout in UI layers; selectable widget layout in UI layers; operational flow between UI layers; operational flow between selectable widgets in a UI layer; font size, shape, and/or color; selectable widget size, shape, and/or color; applications made available through the VDU; movies, television programs and/or audio programs made available through the VDU, shuffled order of UI elements display; timing and/or selection of advertisements and/or advertisement display format; timing and/or selection of help items. Other UI elements can include how persons are invited to a chatroom, how persons are grouped as candidates for invitation to an interest-grouped chatroom, how persons who are joined in a chatroom are graphically represented on a GUI displayed to passengers, etc.

FIG. 4 illustrates further operations that may be performed by the UI control processor 110, e.g., via the user centric UI adaptation controller 200, to generate passenger metrics that can be used to control one or more of the UI elements. Although FIG. 4 illustrates a sequence of operations it is to be understood that the UI control processor 110 may be configured to perform only one of the operations, to perform a plurality of operations and select among the plurality based on the passenger metrics and/or based on a defined rule which may respond to a defined event occurring at the time.

Figure 5:
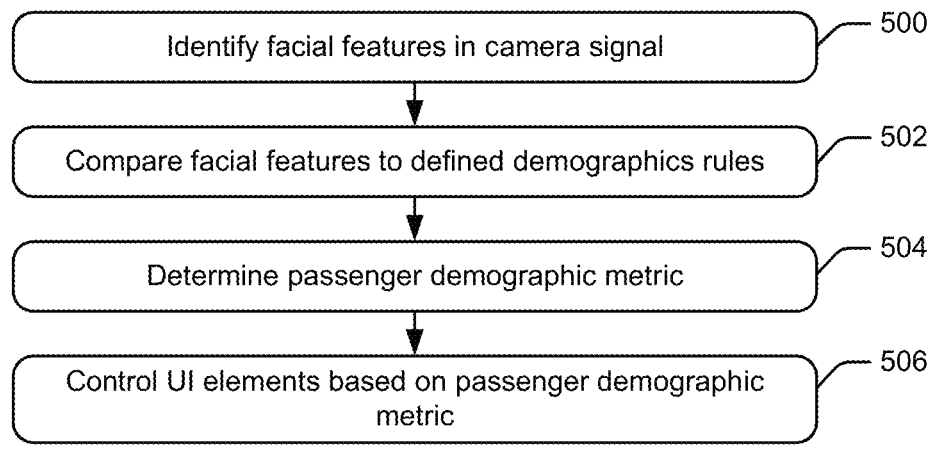

Referring to FIG. 4, the operations may include determining (block 400) a passenger demographic metric based on the passenger data. In one nonlimiting example approach, the controller 200 may analyze the camera signal to estimate the passenger's age based on hair color, sensed facial wrinkles or skin tightness, complexion, height, weight, etc. The controller 200 may similarly determine the gender and/or ethnicity of the passenger based on skin color, eye color, etc. In the embodiment of FIG. 5, the VDU 100 includes a camera configured to output a camera signal containing data representing the passenger's face. The UI control processor 110 is configured to process the camera signal to identify (block 500) facial features of the passenger, and compare (block 502) the facial features to defined demographics rules. The UI control processor 110 determines (block 504) a passenger demographic metric based on the comparison of the facial features to the defined demographics rules, and controls (block 506) the UI of the VDU 100 based on the passenger demographic metric.

Figure 6:
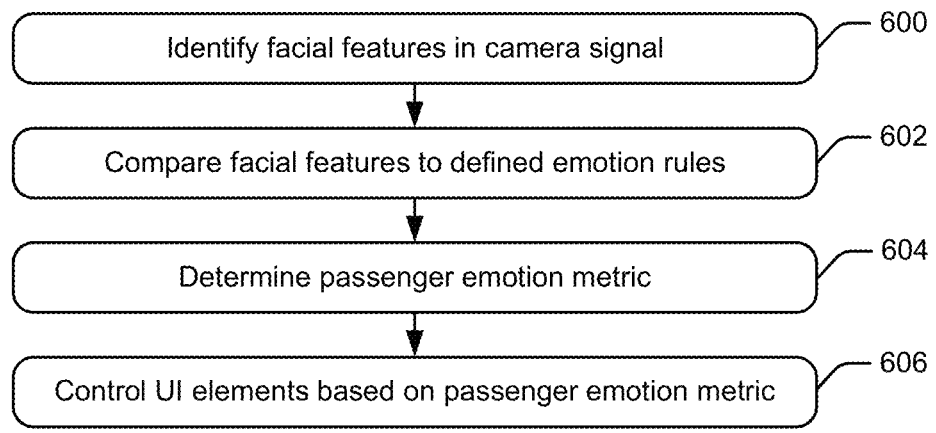

With further reference to FIG. 4, the operations may include determining (block 402) a passenger emotion metric based on the passenger data. In the embodiment of FIG. 6, the UI control processor 110 is configured to process the camera signal to identify (block 600) facial features of the passenger, and compare (block 602) the facial features to defined emotion rules, such as by identifying facial expressions that are compared to the emotion rules. The UI control processor 110 determines (block 604) a passenger emotion metric based on the comparison of the facial features to the defined emotion rules, and controls (block 606) the UI of the VDU 100 based on the passenger emotion metric. The facial analysis operations performed on the camera signal may identify occurrences of facial expressions that are classified based on the emotion rules as being, for example, neutral, smiling, laughing, sad, bored, sleeping, or surprised.

The processor 110 may correlate changes in emotion to a timeline of the content, such as by correlating identified emotions to a timeline of content dialog or scene changes within content. Changes in emotion may be correlated to introduction or removal of advertisements which may be displayed in-line during commercial breaks in the content or displayed in parallel (e.g., within advertisement bars adjacent to the content, within picture-in-picture windows overlaid on the content, etc.) and/or correlated to tracked locations within advertisement dialogs or advertisement scene changes within content. The correlations may be identified by information included in the enhanced content usage metrics. Thus, for example, the UI of the VDU 100 may be controlled based on an average level of happiness, sadness, boredom, surprise, inattentiveness, etc. exhibited by the passenger during identified scenes and/or times within the content.

Figure 7:
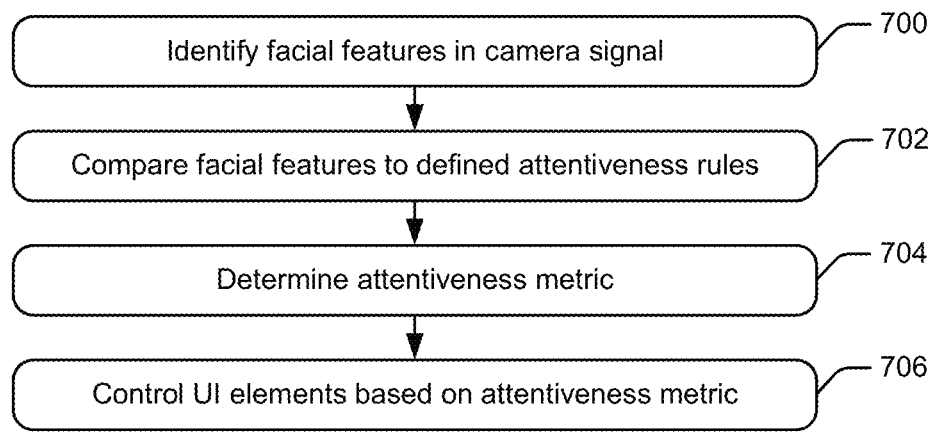

With further reference to FIG. 4, the operations may include determining (block 404) a passenger attentiveness metric based on the passenger data. In the embodiment of FIG. 7, the UI control processor 110 is configured to process the camera signal to identify (block 700) facial features of the passenger, and compare (block 702) the facial features to defined attentiveness rules. The UI control processor 110 determines (block 704) a passenger attentiveness metric based on the comparison of the facial features to the defined attentiveness rules, and controls (block 706) the UI of the VDU 100 based on the passenger attentiveness metric.

Figure 8:
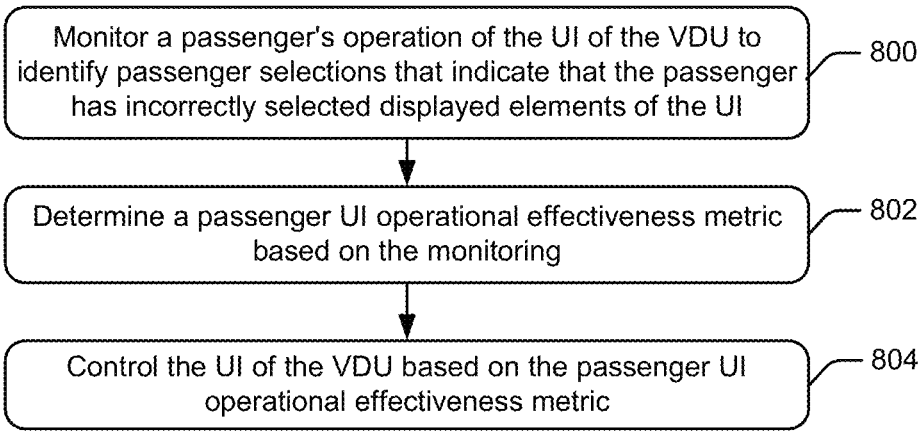
Figure 9:
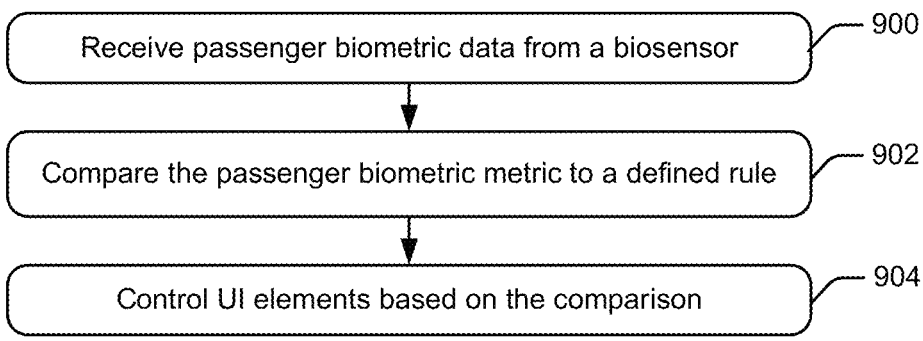

With further reference to FIG. 4, the operations may include determining (block 406) a passenger's UI operational effectiveness metric based on the passenger data. In the embodiment of FIG. 8, the UI control processor 110 is configured to monitor (block 800 a passenger's operation of the UI of the VDU 100 to identify passenger selections that indicate that the passenger has incorrectly selected displayed elements of the UI and/or has selected an ineffective (e.g., inefficient) sequence of displayed elements to perform an operation. A passenger UI operational accuracy metric is determined (block 802) based on the monitoring, and the UI of the VDU 100 is controlled (block 804) based on the passenger UI operational effectiveness metric.

With further reference to FIG. 4, the operations may include determining (block 408) if a passenger's biometric data satisfies a defined rule. In the embodiment of FIG. 8, the UI control processor 110 is configured to receive (block 900) passenger biometric data from a biosensor, compare (block 902) the passenger biometric data to a defined rule, and control (block 904) the UI of the VDU 100 based on the comparison.

Figure 10:
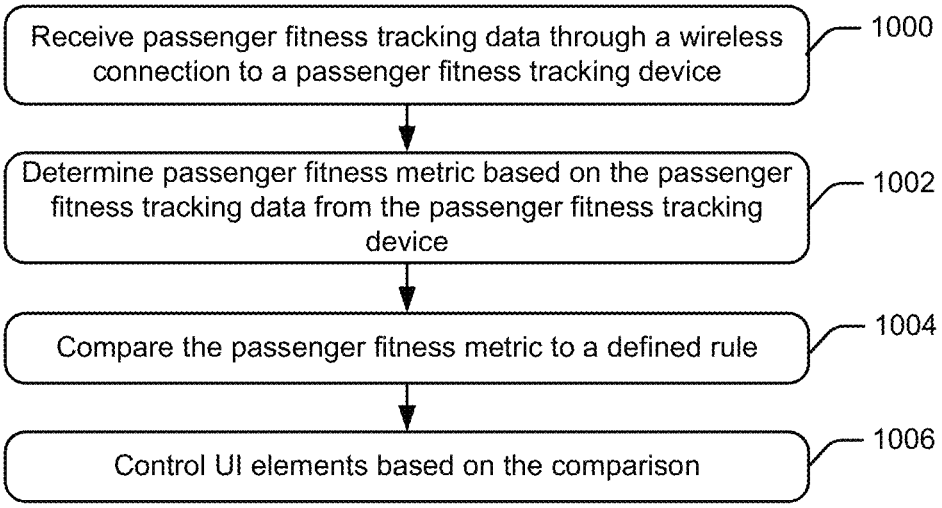

With further reference to FIG. 4, the operations may include determining (block 410) a passenger metric based on fitness data received from the passenger's electronic device. In the embodiment of FIG. 10, the UI control processor 110 is configured to receive (block 1000) passenger fitness tracking data through a wireless connection to a passenger fitness tracking device (e.g., mobile phone, fitness tracking device worn by passenger, etc.). A passenger fitness metric is determined (block 1002) based on the passenger fitness tracking data from the passenger fitness tracking device. The UI control processor 110 can compare the passenger fitness metric to a defined rule, and control (block 1006) the UI of the VDU 100 based on the comparison.

With further reference to FIG. 4, the UI control processor 110 may perform operations to generate (block 412) a passenger metric based on content that has been tracked and determined to have been consumed through the VDU 100. The passenger metric may characterize which content items were consumed during a flight and how much passenger attention was given to various portions of the content items. The passenger metric may be generated (block 414) based on advertisements that have been displayed on the VDU 100, and may be further generated based on tracking where on the display device the passenger has looked and for how long, and if and how long the passenger has looked at the displayed advertisements. The passenger metric may be generated (block 416) based on a present flight phase of the aircraft, and/or may be generated (block 418) based on cabin events (e.g., announcements, food/beverage service, etc.) that are directed to the passenger individually or collectively to the passengers.

Metrics may be generated based on flight phase information, which may include one or more of boarding phase, departure taxi phase, take off phase, cruise phase, landing phase, arrival taxi phase, and disembarking phase. Metrics may be generated based on flight itinerary information, which may include one or more of the departure city, the destination city, departure time, arrival time, and flight duration. Metrics may be generated based on one or more of providing food (e.g., meal and/or beverage) service, crew announcements to passengers, occurrence of aircraft turbulence, and other events that may affect a passenger's attentiveness to information and operational widgets displayed through the UI, and which may affect that ability of the passenger to correctly operate the UI.

The processor 110 can be further configured to process the camera signal to determine an eye viewing location on a display device of the VDU 100, and to correlate the eye viewing location to a timeline of content consumed by the user through the VDU 100. The processor 110 may control the UI based on the correlation of the eye viewing location to the timeline of content consumed by the user through the VDU 100. The processor 110 may identify particular locations within a timeline of the content that triggered changes in passenger emotion, such as laughing, smiling, surprise, etc. The metrics may indicate whether and how long a passenger looked at an advertisement displayed in a border area to a movie, how long a passenger looked at content of the movie and what content, how long the passenger looked elsewhere while the movie was playing and what content was missed, how long a passenger looked at defined items contained within the movie (e.g., products placed within a movie for advertisement), etc, and generate metrics based thereon.

The UI control processor 110 may mine passenger information which is used to characterize potential passenger discussion interests, identify based on those interests the groupings of passengers who satisfy a common interest rule, and communicate with those passengers through a computerized chatbot to invite them to discussion-focused chatrooms provided by a chatroom manager module hosted by a chatroom server. The passenger metrics described above, such as the facial analysis operations performed on the camera signal, eye tracking metrics, and/or other metrics that are measured, observed, determined, or obtained, may be used to identify passengers who satisfy a common interest rule or who satisfy another rule for being candidates for invitation to a group chatroom.

The UI control processor 110 can control (block 420) one or more of the UI elements of the VDU 100 based on one or more of these and/or other metrics.

Figure 11:
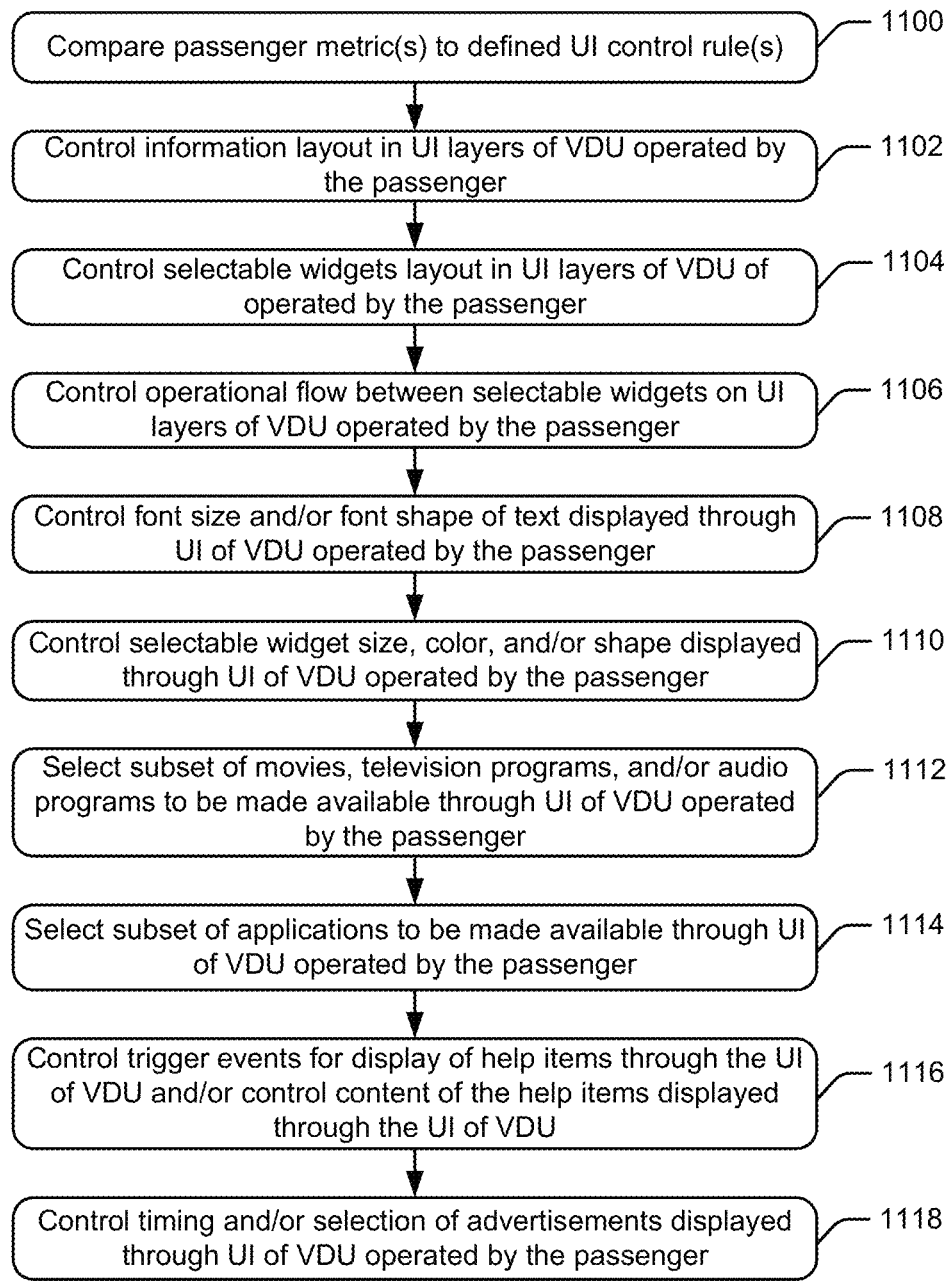
FIG. 11 illustrates a VDU configured according to some embodiments.

In the embodiments of FIG. 11, the UI control processor 110 can compare (block 1100) one or more of the determined passenger metrics to one or more defined rules to determine how to control the UI of the VDU 100 and/or to identify passengers who satisfy a rule for being common interest candidates who will be invited to a group chatroom with other passengers who also satisfy the rule for being common interest candidates, as will be described in further detail below. The layout of information in UI layers of the VDU 100 can be controlled (block 1102) based on the comparison. In one embodiment, the UI control processor 110 selects a layout of information for UI layers from among a plurality of different defined layouts of information for UI layers displayable on the VDU 100 based on the passenger metric, and displays the defined layout of information for the UI layers through the UI of the VDU 100.

The layout of selectable widgets in UI layers of the VDU 100 can be controlled (block 1104) based on the comparison. In one embodiment, the UI control processor 110 selects a layout of selectable widgets for a UI layer from among a plurality of different defined layouts of selectable widgets for a UI layer displayable on the VDU 100 based on the passenger metric, and displays the defined layout of selectable widgets for the UI layer through the UI of the VDU 100 operated by that passenger.

The operational flow between UI layers of the VDU 100 can be controlled (block 1106) based on the comparison. In one embodiment, the UI control processor 110 selects an operational flow between passenger selectable widgets of different UI layers from among a plurality of different defined operational flows between passenger selectable widgets of different UI layers displayable on the VDU 100 based on the passenger metric, and controls the operational flow between the passenger selectable widgets of the different UI layers displayed through the UI of the VDU 100 operated by the passenger, based on the operational flow that was selected.

For example, the list of menus and/or operational features presented to passengers and/or content of menus presented for triggering operational flows may be simplified for passengers who are estimated be younger or older than a threshold age. Passengers within a defined age range may be provided more menu options for more advanced functionality and/or provided a greater array of operational features of the video display unit 100, while other passenger outside the defined age range may be precluded from accessing such advanced functionality and/or provided a subset of the array of operational features.

The font size, font shape, and/or color of text displayed through the UI of the VDU 100 operated by the passenger, can be controlled (block 1108) based on the passenger metric. Alternatively or additionally, the size, the shape, and/or the color of passenger selectable widgets displayed through the UI of the VDU 100 operated by the passenger, can be controlled (block 1110) based on the passenger metric.

For example, the processor 110 may determine a size or layout of text and/or passenger selectable widgets to be displayed on the VDU 100 responsive to an estimate of the passenger's age. For example, passengers having an age beyond a threshold value may be displayed text or selectable widgets having a greater minimum size and/or less graphically complex screen layouts than younger passengers, or vice versa. Similarly, passengers who are exhibiting tiredness or inattentiveness may be displayed text or selectable widgets having a greater minimum size than younger passengers and/or less graphically complex screen layouts than passengers not exhibiting those identifiable conditions, or vice versa.

The processor 110 can control what content is offered for consumption through the VDU 100 based on the passenger demographics, passenger emotion, and/or attentiveness. For example, the processor 110 may filter a set of content stored on the content server 10 to generate a filtered list based on the determine user demographics, passenger emotion, and/or attentiveness, and communicate the filtered list of available content to the VDU 100 for display to that passenger. Thus, the content made available to a passenger can be filtered based on an estimate of the passengers age and/or emotion. Passengers who exhibit a threshold level of attentiveness or, alternatively, less than a threshold level of attentiveness, may be provided an expanded variety of content consumed through their respective VDUs 100.

The processor 110 may filter the list of movies, television programs, audio programs, and/or applications to generate a recommended list based on correlating the passenger attributes to historical data indicating the preferences of passengers who have certain determined attributes. Thus, for example, the processor 110 may use a repository of information that identifies various content preferences that have been observed for passengers having identified attributes, to generate a list of movies, television programs, audio programs, and/or applications that are predicted to be preferred by the present passenger based on the present passenger's attributes.

The processor 110 may alternatively or additionally select among the passengers on-board the aircraft for inviting to a group chatroom based on correlating the passenger attributes to historical data indicating the preferences of passengers who have certain determined attributes.

In a related embodiment, the UI control processor is configured to control the UI of the VDU 100 based on the passenger metric by controlling an order with which content is identified in a list based on the passenger metric. The content is available for display through the UI of the VDU 100 responsive to passenger selection among the ordered list of content. At least a portion of the ordered list of content is then displayed through the UI of the VDU 100.

In some embodiments, a subset of movies, television programs, and/or audio programs that are available on the head end content server 40, can be selected (block 1114) to be made available through the UI of the VDU 100 operated by that passenger, based on the passenger metric. In one embodiment, the UI control processor 110 generates a list of movies, television programs, and/or audio programs that are available from the memory within the content server 40 to be displayed through the UI of the VDU, and filters the list of movies, television programs, and/or audio programs based on the passenger metric to generate a filtered list of movies, television programs, and/or audio programs. The processor 110 then displays the filtered list of movies, television programs, and/or audio programs through the UI of the video display unit 100. The filtering may furthermore be based on metadata that has been associated with the content. The metadata may include, but is not limited to, a description of the content, poster art representing the content, etc.

A subset of applications that are available on the head end content server 40, can be selected (block 1114) to be made available through the UI of the VDU 100 for operation upon by a processor of the VDU 100, based on the passenger metric. In one embodiment, the UI control processor 110 generates a list of applications that are available from the memory within the content server 40 to be selectable through the UI of the VDU 100 operated by the passenger for execution by UI control processor 110 or another processor of the VDU 100. The list of applications is filtered based on the passenger metric to generate a filtered list of applications, and the filtered list of applications is displayed through the UI of the VDU 100.

The events that trigger display of help items through the UI of the VDU 100 can be controlled (block 1116) based on the passenger metric. In one embodiment, the UI control processor 110 selects a help item trigger event from among a plurality of different defined help item trigger events based on the passenger metric, and initiates display of a help item through the UI of the VDU 100 operated by the passenger, based on the help item trigger event that was selected becoming satisfied.

The content of the help items displayed through the UI of the VDU 100 is controlled (block 1116) based on the passenger metric. In one embodiment, the UI control processor 110 selects a help content item from among a plurality of different defined help content items based on the passenger metric, and displays the help content item that was selected through the UI of the VDU 100 operated by the passenger.

The timing and/or selection of advertisements for display through the UI the VDU 100 can be controlled (block 1118) based on the passenger metric. In one embodiment, the UI control processor 110 selects an advertisement from among a plurality of different defined advertisement based on the passenger metric, and displays the advertisement that was selected through the UI of the VDU 100. In another embodiment, the UI control processor 110 selects an advertisement from among a plurality of different defined advertisement based on which of a plurality of chatrooms the passenger has accepted an invitation to and is presently participating, and displays the advertisement that was selected through the UI of the VDU 100.

In another embodiment, the UI control processor 110 selects an advertisement trigger event from among a plurality of different defined advertisement trigger events based on the passenger metric. The UI control processor 110 then initiates display of an advertisement through the UI of the VDU 100 operated by the passenger, based on the advertisement trigger event that was selected becoming satisfied.

Figure 12:
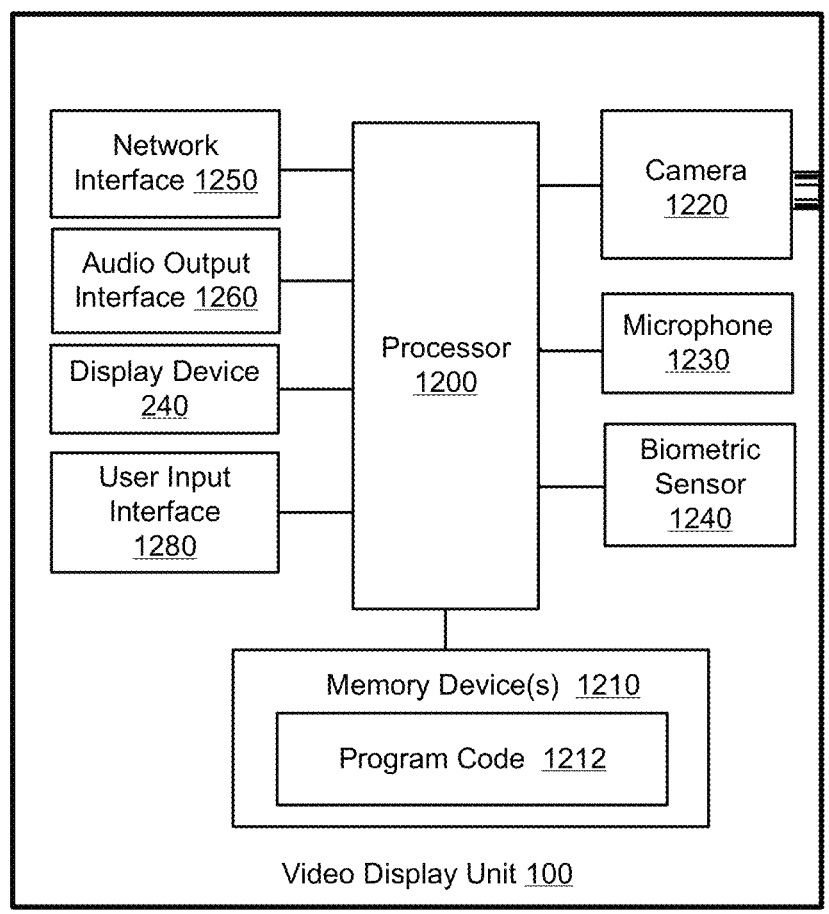
FIG. 12 is a block diagram of components that may be included in the VDU 100 configured to operate according to some embodiments.

FIG. 12 is a block diagram of components that may be included in the VDU 100 configured to operate according to some embodiments. One or more of the components illustrated in FIG. 11 may be included in one or more elements of the system 10 other than the VDU 100, such as within the head end content server 40, a UI control processor 110 that is separate from the VDU 100, or elsewhere. The VDU 100 includes a processor 1200 and a memory 1210 containing program code 1212. The processor 1200 includes one or more data processing circuits, such as a general purpose and/or special purpose processor (e.g., microprocessor and/or digital signal processor). The processor 1200 is configured to execute the program code 1212 in the memory 1210, described below as a computer readable medium, to perform some or all of the operations and methods that are described herein for one or more of the embodiments.

The VDU 100 can include a camera 1220, a microphone 1230, a biometric sensor 1240, a network interface 1250 (e.g., wired or RF wireless communication interface), an audio output interface 1260, a display device 240, and a user input interface 1280 (e.g., touch screen interface, switches, control wheels, buttons, keypad, keyboard, etc.). The camera 1220 is positioned to view a passenger who is operating the VDU 110 and configured to generate a camera signal. The camera 1220 may be any type of sensor that can generate data representing observable characteristics of a passenger. The display device 240 is configured to display images to a passenger and display user selectable widgets (e.g., programmatic soft-buttons, etc.) that the passenger can select to control various functional operations of the IFE system 10.

The processor 1200 processes the camera signal using image detection algorithms (e.g., facial feature expression detection algorithms) and defined rules to identify passenger demographics, passenger emotions, passenger attentiveness, passenger eye viewing locations, and other tracked passenger characteristics, which can be used to generate passenger metrics. The processor 1200 may further operate to track content that was consumed or particular portions of content that was consumed through the VDU 100 by a passenger. The processor 1200 may further operate to correlate the passenger metric(s), e.g., facial expression, mood, attentiveness, etc.) to particular portions of content that is consumed through the video display units 100a-n, and may generate the enhanced content usage metrics based on correlations determined for particular portions of content that was consumed through the video display units 100a-n. As explained above, consumption of content can include viewing the content (e.g., movie, TV program, textual information, informational video), running an application program (e.g., game), listening to audio programming, etc.

The network interface 1250 may connect through a RF transceiver to a fitness tracking device (e.g., mobile phone, fitness tracking device worn by passenger, etc.) carried by the passenger to receive fitness data. The biometric sensor 1140 may be contained within the VDU 100 or may be communicatively connected to the processor 1200 through the network interface 1250. The biometric sensor 1240 may be configured to sense biometric that can include, but is not limited to, passenger's temperature, passenger's heart rate, passenger's respiration rate, passenger's weight, passenger's fingerprint, passenger's iris features, and/or other biometric attributes of the passenger. The biometric sensor 1240 may be contained within a headphone worn by the passenger, contained in an armrest or other seat surface of a seat occupied by the passenger, or be contained or provided by one or more other components of the system 10.

The microphone 1230 may be configured to receive spoken commands from a passenger, which can be interpreted by the processor 1200 to control the UI of the VDU 100. The microphone 1230 may alternatively or additionally be configured to sense ambient noise, such as engine noise and/or announcements in the cabin, and control the UI of the VDU 100. For example, the processor 1200 may pause operation of content being consumed through the display device 240 and/or pause user selectable of the widgets displayed on the display device 240 while an announcement by a crew member is detected through the microphone 1230.

Systems, Operations, and Methods by a Vehicle Entertainment System with a Chatroom Server As explained above, some embodiments of the present disclosure are directed to increasing passenger usage of chatroom UI communication capabilities provided by vehicle entertainment systems. More particularly, some embodiments of the present disclosure provide a computerized chatroom UI communication capability that analyzes passengers' usage of their Personal Electronic Devices (PEDs) and/or wired passenger terminals provided by a vehicle entertainment system, identifies groups of passengers who satisfy a common interest rule, and communicates with those passengers to invite them to interest-grouped chatrooms hosted by a chatroom server which can reside on the vehicle.

Figure 13:
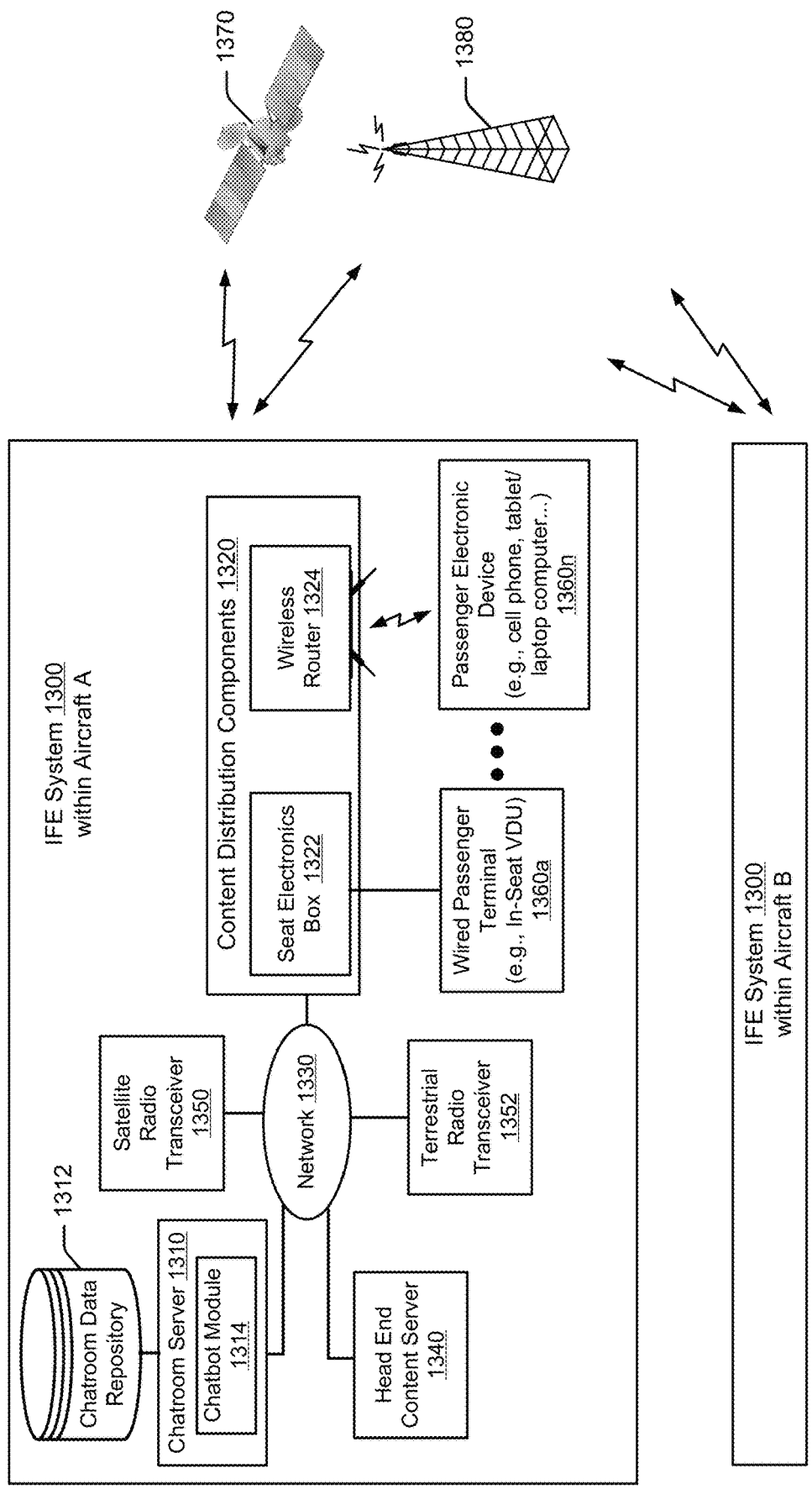
FIG. 13 is a block diagram of two IFE systems within different aircraft that may communicate with each other according to some embodiments.

FIG. 13 is a block diagram of two IFE systems 1300 within different aircraft, i.e., Aircraft A and Aircraft B, that may communicate with each other according to embodiments disclosed herein. In some embodiments, the IFE systems 1300 can communicate with each other between the aircraft through a satellite radio transceiver 1350 via a satellite communication system 1370 and/or through a terrestrial radio transceiver 1352 via a ground-based terrestrial communication system 1380, e.g., cellular radio base stations and cellular backbone networks.

The IFE system 1300 may include wired passenger communication terminals 1360a (e.g., seatback video display units (VDUs)), PEDs 1360n (e.g., cellular phones, tablet computers, laptop computers, etc., which can be transportable onto the aircraft by passengers and/or airline crew), a head end content server 1340, and distribution components 1320. The wired passenger communication terminals 1360a and the PEDs 1360n are also referred to as passenger terminals 1360 for brevity. The head end content server 1340 serves content to the passenger terminals 1360 responsive to content selection commands received therefrom through a data network 1330 and the distribution components 1320. The distribution components 1320 may include seat electronics boxes 1322, which can be spaced apart adjacent to different groups of seats, and/or one or more wireless communication routers 1324.

Example content that can be provided by the head end content server 1340 can include, but is not limited to, movies, TV programs, audio programs, application programs (e.g. games, news, etc.), informational videos and/or textual descriptions (e.g., regarding destination cites, services, and products), and advertisements. The wireless router 1324 may be a WLAN router (e.g. IEEE 802.11, WIMAX, etc), a cellular-based network (e.g. a pico cell radio base station), etc.

The illustrated IFE system 1300 further includes a chatroom server 1310 connected to a chatroom data repository 1312 which may be separate from or at least partially integrated within the head end content server 1340, or which may reside at least partially off-board the aircraft such as on a ground-based server which is communicatively networked to the IFE system 1300. The chatroom server 1310 provides chatroom functionality to the aircraft passengers that allows passengers to post textual messages, audio messages, pictures, and/or video to a chatroom for viewing by other passengers who have joined the same chatroom, and vice-versa to view textual messages, audio messages, pictures, and/or video posted to that chatroom by the other passengers who have joined that chatroom.

The chatroom functionality can automatically mine passenger information which is used to characterize potential passenger discussion interests, identify based on those interests the groupings of passengers who satisfy a common interest rule, and communicate with those passengers through a computerized chatbot to invite them to discussion-focused chatrooms provided by a chatroom manager module hosted by the chatroom server 1310. The computerized chatbot operations can be provided by a chatbot module 1314 that operates to interact with passengers using natural language questions and answers responsive to textual input from passengers. The chatbot module 1314 may simulate human written interactions with sufficient accuracy so that passengers are not aware they are interacting with a computerized module rather than a person. The chatroom server 1310 can thereby automatically identify groups of passengers who analytically appear to sufficiently share common interests that they should accept an electronic invitation from the server 1310 to join one of the discussion-focused chatrooms to talk with other passengers sharing those interests.

Figure 14:
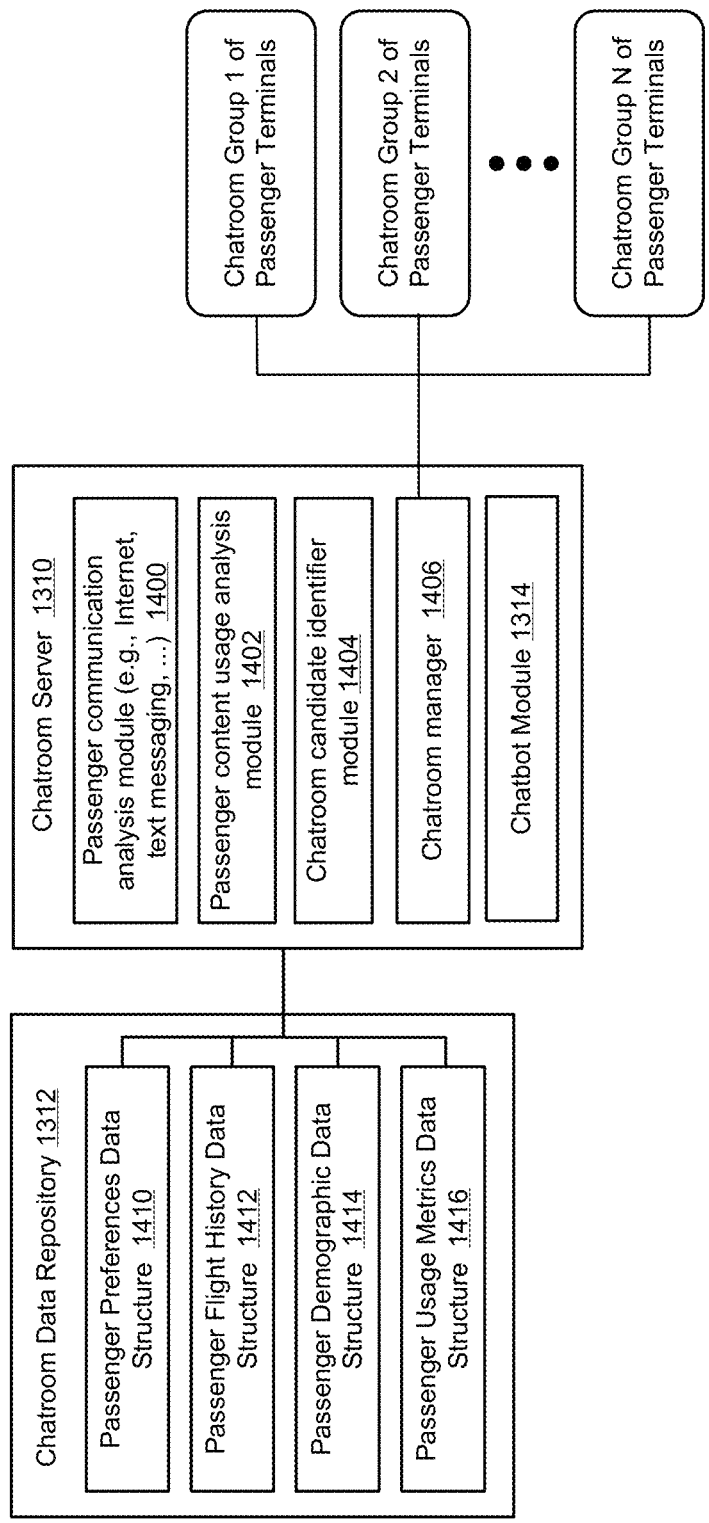
FIG. 14 illustrates operations and methods that may be performed by the chatroom server and the chatroom data repository of FIG. 13 to increase passenger usage of chatroom functions provided by the IFE systems according to some embodiments.

FIG. 14 illustrates operations and methods that may be performed by the chatroom server 1310 and the chatroom data repository 1312 to increase passenger usage of the chatroom functions provided by the IFE system 1300.

Referring to FIGS. 13 and 14, the chatroom server 1310 can execute various modules that mine information which is used to characterize potential passenger discussion interests. A passenger communication analysis module 1400 monitors characteristics of a passenger's Internet browsing, text messaging, and other electronic communications through their PEDs 1310n and/or the associated wired terminals 1360a (e.g., seat-connected video display units).

In some embodiments, the module 1400 communicates with a user application that is being executed by the PEDs 1360n and which may be an airline sponsored application that passengers have downloaded and installed from an application store. The application store may be the Apple application store server (e.g., iTunes), one or more of the Android application store servers (e.g., Google Play and/or Amazon Appstore), or the Windows application store server. The user application may monitor application programming interface (API) calls and/or other communications by an Internet browser application, a texting application, and other applications executed by the PED 1360n that are communicating with one or more external-facing network interfaces, such as WiFi, cellular, Bluetooth, or other signal processing communication modules controlling associated radio transceiver circuits of the PED 1310n.

The user application may perform deep-packet inspection of communications output from the Internet browser application, the texting application, and/or the other applications executed by the PED 1360n. The deep-packet inspection can be performed to identify keywords in the communications (e.g., a website universal resource locator (URL) address or text contained in a user message, such as a Short Messaging Service message, to be transmitted by the PED 1360 to, for example, another PED that is on-board the aircraft, another aircraft, or residing on the ground). The user application may generate statistical metrics based on occurrences of the identified keywords, identify characteristics of the identified keywords based on one or more defined rules, and/or identify source/destination addresses for the communications (e.g., website URL address). The user application communicates results of its monitoring to the passenger communication analysis module 1400, and may communicate the identified keywords, the identify characteristics of the keywords, and/or the statistical metrics to the module 1400. The module 1400 may store the received information or other information derived therefrom in a passenger usage metric data structure 1416 of the chatroom data repository 1312 or in another repository that can reside on a ground-based server that is networked to the IFE system 1300.

In some embodiments, the passenger communication analysis module 1400 executes on the chatroom server 1310 to monitor application programming interface (API) calls and/or other communications output by a wired passenger terminal 1360a being operated by a passenger. The module 1400 may, for example, perform deep packet inspection to identify keywords in the communications output from an Internet browser application, a texting application, and other applications that can be executed by the wired passenger terminal 1360a or can be executed by the chatroom server 1310 operating under control of messages received from a proxy application executed by the wired passenger terminal 1360a. The module 1400 may intercept or otherwise monitor keywords contained in communications from the PEDs 1360n that are carried through the content distribution components 1320 and the network 1330 for relay to other PEDs 1360n and/or the wired passenger terminals 1360a on the aircraft, or for transmission through one of the transceivers 1350 and 1352. Again, the module 1400 may store the received information or other information derived therefrom in the passenger usage metric data structure 1416 of the chatroom data repository 1312 or in another repository that can reside on a ground-based server that is networked to the IFE system 1300.

The chatroom server 1310 may alternatively or additionally include a content usage analysis module 1402 that tracks what content is browsed and/or selected for viewing by a passenger through an identified passenger terminal 1360 (i.e., wired terminal or wireless PED). The module 1402 can use metadata associated with the tracked content to identify the name of the content, the content genre, how much of the content was viewed, how often the content was viewed, etc. The module 1402 may identify from the genre, information that can include, without limitation, type of news, type of movie (e.g., action, drama, comedy, Motion Picture Association or other rating level, etc.), type of music, type of television show, type of game, type of electronic book or other textual content consumed. The module 1402 may track passenger attribute data that can include, but is not limited to, one or more of the following: passenger emotion data (e.g., identified in camera signal) while viewing and/or listening to the identified content provided by the chatroom server 1310 and which can be operationally correlated to content characteristic metric(s) identifying characteristics of the viewed/listened-to content (e.g., romantic scene, action scene, comedic scene, scary scene, names of actor(s)/actress(es) viewed in the identified content, names/genres of music played during the viewing of the identified content, etc.); passenger attentiveness data while viewing and/or listening to identified content, provided by the chatroom server 1310, and which can be operationally correlated to the content characteristic metric(s); passenger biometric data while viewing and/or listening to identified content provided by the chatroom server 1310 and which can be operationally correlated to content characteristic metric(s); and data identifying cabin events directed to the passenger and/or flight phase data. The module 1402 may store the tracked information or other information derived therefrom in the passenger usage metric data structure 1416 of the chatroom data repository 1312 or in another repository that can reside on a ground-based server that is networked to the IFE system 1300.

The passenger emotion data and/or attentiveness data may be determined using a camera contained in the passenger terminal 1360, such as within a seatback display unit facing the passenger. The operations may include determining a passenger demographic metric based on analyzing a camera signal from the camera to estimate the passenger's age based on hair color, sensed facial wrinkles or skin tightness, complexion, height, weight, etc. The module 1402 may similarly determine the gender and/or ethnicity of the passenger based on skin color, eye color, etc. The module 1402 may determine a passenger demographic metric based on comparison of the passenger's facial features to defined demographics rules.

The module 1402 may correlate changes in emotion to a timeline of the content, such as by correlating identified emotions to a timeline of content dialog or scene changes within content. Changes in emotion may be correlated to introduction or removal of advertisements which may be displayed in-line during commercial breaks in the content or displayed in parallel (e.g., within advertisement bars adjacent to the content, within picture-in-picture windows overlaid on the content, etc.) and/or correlated to tracked locations within advertisement dialogs or advertisement scene changes within content. The correlations may be identified by information included in the enhanced content usage metrics. Thus, passenger may be characterized based on an average level of happiness, sadness, boredom, surprise, inattentiveness, etc. exhibited by the passenger during identified scenes and/or times within the content.

The operations of the module 1402 may include determining a passenger attentiveness metric based on the passenger data. The module 1402 can be configured to process the camera signal to identify facial features of the passenger, and compare the facial features to defined attentiveness rules. The module 1402 can characterize the passenger based on the comparison of the facial features to the defined attentiveness rules.

The determined emotion and/or attentiveness of the passenger while viewing certain content can be used by the module 1402 to characterize interests of the passenger, such as the passenger presently liking or disliking a particular program, game, or other content, or more particularly liking or disliking a particular scene, scenario, or other subject matter portrayed in that content. Thus, for example, passengers who are determined to have an interest in watching action scenes within a particular television program series can be identified for possible invitation by a module explained below to a chatroom that is focused on discussing that television program series with other passengers determined to have that shared interest.

The chatroom server 1310 also includes a chatroom candidate identifier module 1404 that can use analysis provided by the passenger communication analysis module 1400, the content usage analysis module 1402, and/or other information characterizing passengers, to identify a group of passengers who satisfy a common interest rule and who thereby may be interested in joining an interest-grouped chatroom provided by a chatroom manager 1406 executed by the chatroom server 1310. The candidate identifier module 1404 may query a passenger preferences data structure 1410 within the chatroom data repository 1312 to obtain preferences that have been registered or otherwise determined for a particular passenger. The registered preferences may include, but are not limited to, home address, work address, content genre preferences (e.g., as defined above), preferred language, preferred food and/or drink, etc. The registered preferences may be determined based on querying the passenger or based on querying a ground-based server that may be involved in the passenger flight reservation process and/or as during passenger interaction for an airline account, such as a frequent flyer account function. Querying of the passenger may be performed by the chatbot module 1314 using natural language questions and responses that operate to interact through textual and/or machine synthesized speech interface(s) to the passenger and corresponding voice-to-text conversion by the chatbot module 1314. The candidate identifier module 1404 may query a passenger flight history data structure 1412 within the chatroom data repository 1312 to obtain information regarding the present flight and historical flights departure cities, present flight and historical flights arrival cities, the present flight route with interconnecting layover city(ies).

The candidate identifier module 1404 may query a passenger demographic data structure 1414 within the chatroom data repository 1312 to obtain information that has been determined regarding one or more demographic characteristics of the passenger. The demographic characteristics may include, but are not limited to, age bracket, gender, visual impairments, hearing impairments, hand or other motor skill impairments, etc. The demographic characteristics may be determined based on one or more of the camera based operations above, by querying the passenger, and/or based on querying a ground-based server that may be involved in the passenger flight reservation process or other pre-flight passenger interfacing process.

The candidate identifier module 1404 may characterize a passenger based on fitness data received through a network interface (e.g., Bluetooth or WiFi) from a passenger's fitness tracking electronic device (e.g., sports watch, activity tracking application on the passenger's PED, etc.). For example, passengers who appear to regularly run, walk at least threshold distances, or participate in at least threshold levels of other physical activity may be identified as candidates for inviting to a running-focused, sports-focused, walking-focused or other such interest-focused chatroom.

The chatroom candidate identifier module 1404 uses the usage metrics, preferences, flight history, demographics, and other determined information of passengers on the flight to identify a group of those passengers who's information satisfies a common interest rule and who thereby may be interested in joining an interest-grouped chatroom provided by the chatroom manager 1406 executed by the chatroom server 1310.

The chatroom manager 1406 performs the chatbot module 1314 that electronically communicates (e.g., natural language textual displayed interactions and/or machine synthesized speech interactions) with selected passengers to invite them to join a particular one of the interest-grouped chatrooms. The chatbot module 1314 sends a computer generated message (text and/or audible speech) to a passenger via a known network addressable PED 1360*n* carried by the passenger and/or via a wired passenger terminal 1360*a* (e.g., VDU) that is identified as being associated with a seat assignment for the passenger. The chatbot module 1314 can correspond with passengers through the computer generated messages using natural language content that simulates conversation by a human operator. The chatbot module 1314 can contain rule-based algorithms that are executed by one or more processors of the chatroom server 1310 to provide natural language conversation between the chatbot manager 1406 and passengers.

The chatbot module 1314 can send a message to a passenger asking the passenger to join a chatroom to talk with other passengers on the same aircraft (e.g., Aircraft A) as the passenger and/or on another aircraft (e.g., Aircraft B) to discuss a subject that is defined based on the common interest rule that was determined to be satisfied by the information for that passenger. The passenger can send a responsive acceptance message to the chatbot module 1314 that triggers the chatroom manager 1406 to join the passenger terminal 1360 into the defined chatroom. The chatroom manager 1406 provides chatroom functionality that allows passengers to post textual messages, audio messages, pictures, and/or video to a chatroom for viewing by other passengers who have joined the same chatroom, and vice-versa to view textual messages, audio messages, pictures, and/or video posted to that chatroom by the other passengers who have joined that chatroom.

By way of one particular non-limiting example, the chatroom candidate identifier module 1404 can identify passengers on Aircraft A who's destination is a particular city in Europe and can identify passengers in-route on another aircraft, e.g., Aircraft B via communications with the IFE system 1300 on Aircraft B, who are determined based on the obtained passenger information to satisfy a defined rule for presently living in the particular city in Europe and/or a defined rule for presently departing the particular city in Europe after having had at least a defined length stay there. The chatbot module 1314 can respond to such determinations for each of those passengers satisfying the common interest rule for Chatroom Group 1 by separately communicating with those passengers, via the passenger terminals 1360, to ask those passenger to join Chatroom Group 1 which is defined to be focused on discussing shared interests related to visiting the particular city in Europe.

In this manner, passengers who's destination is the particular city in Europe can be invited to join a chatroom with passengers who either live-in or have recently spent a threshold time in that particular city, which encourages interactions between those passengers for exchange of information as to, e.g., recommendations, warnings, or other suggestions as to places to visit, restaurants for meals, meal and/or drink preferences, lodging, public/private transportation options, local customs, local events, etc.

The chatroom candidate identifier module 1404 can furthermore identify other passengers on the Aircraft A who's present flight destination is a particular airport and can identify passengers on another aircraft, e.g., Aircraft B, who satisfy a defined rule for their present flight departing the particular airport. The chatbot module 1314 can responsively electronically communicate individually with those identified passengers to separately ask each passenger to join Chatroom Group 2 which is defined to be focused on shared interests related to airport related weather, flight delays, airport related restaurant recommendations, airport related transportation recommendations, etc.

The chatroom candidate identifier module 1404 may furthermore identify persons who are not yet onboard Aircraft A but who are scheduled in the future to board Aircraft A at one or more scheduled arrival airports within a defined timeframe. The chatbot module 1314 can invite the identified persons to join a chatroom with current passengers of Aircraft A to discuss, for example, departure delays and/or arrival delays that have already occurred and/or which are anticipated for Aircraft A. In that scenario, the chatroom manager 1406 may communicate off-board aircraft A with those persons through one of the transceivers 1350 and 1352 and network addresses known for those persons' PEDs. Thus, passengers who are waiting at an airport for arrival of an inbound aircraft they will board for their scheduled flight, can be automatically requested to join a Chatroom Group N−1 with current passengers of that aircraft and/or previous passengers of that aircraft who, for example, de-planed at a previous destination of the aircraft.

The chatroom candidate identifier module 1404 can furthermore identify other groups of passengers on the Aircraft A and/or across multiple aircraft (i.e., Aircraft B) who satisfy defined similarity rules for other chatroom groups based on their Internet keyword usage, messaging keyword usage, other communications analysis, registered preferences, flight history, demographics, content usage analysis, and/or other information that can be determined or obtained for those passengers. The chatbot module 1314 can electronically communicate individually with those identified passengers to separately ask each passenger to join the other chatroom groups, e.g., Chatroom Group N, to discuss shared interests drive based on such information. For example, chatroom Group N may be managed to invite passengers who appear to have a shared interest in a particular movie/television program or a particular movie/television genre.

Thus, in some embodiments, a vehicle chatroom server is configured to perform operations that include obtaining passenger information. The operations characterize potential passenger discussion interests based on the passenger information, and identify a grouping of passengers who satisfy a common interest rule based on the potential passenger discussion interests. The operations then communicate with passengers in the grouping through a computerized chatbot module providing natural-language text and/or computer synthesized speech that is provided to the passengers in the grouping to invite to a discussion-focused chatroom hosted by the chatroom server.

In a further embodiment, the operations can further include receiving responses from the passengers in the grouping through operation of the computerized chatbot module processing text responses and/or converting passengers' speech-to-text, where the responses received from a sub-grouping of the passengers are determined to indicate acceptance of the invitation. Responsive to the responses, the operations establish communication sessions, through at least one network, between a chatroom manager performed by the vehicle chatroom server and passenger terminals that are associated with passengers in the sub-grouping.

In this manner, passengers who have indicated that they accept the invitation to join the common interest chatroom are connected together via their respective terminals. In contrast, terminals of any passengers who did not indicate their acceptance of the invitation are not joined into the chatroom.

The chatroom server can also filter messages that are exchanged between passengers in a chatroom. In one embodiment, the operations further include, following establishment of the communication sessions, operating the chatroom manager to repeat for each message received from one of the passenger terminals of one of the passengers in the sub-grouping, filtering the message according to at least one chatroom rule, and selectively forwarding the filtered message to the other passenger terminals of other passengers in the sub-grouping through the at least one network.

The operation to filter the message can include scanning the message for any words contained in a prohibited word list. Responsive to identifying presence in the message of one of the words contained in the prohibited word list, the operations can prevent forwarding of the message to the other passenger terminals. In contrast, responsive to identifying no presence in the message of one of the words contained in the prohibited word list, the operations can forward the message to the other passenger terminals.

The chatroom server may moderate which passengers in a chatroom are permitted to communicate according to moderation rule. The moderation rule may limit how frequently a passenger is permitted to provide input to a chatroom, e.g., to prevent one passenger from overly dominating a discussion. The moderation rule may block a passenger who has been determined to have more than a threshold number of messages blocked due to containing words in the prohibited word list, and/or may block a passenger who has been flagged by another passenger or by a threshold number of other passengers as having provided offensive input to the chatroom.

Figure 15:
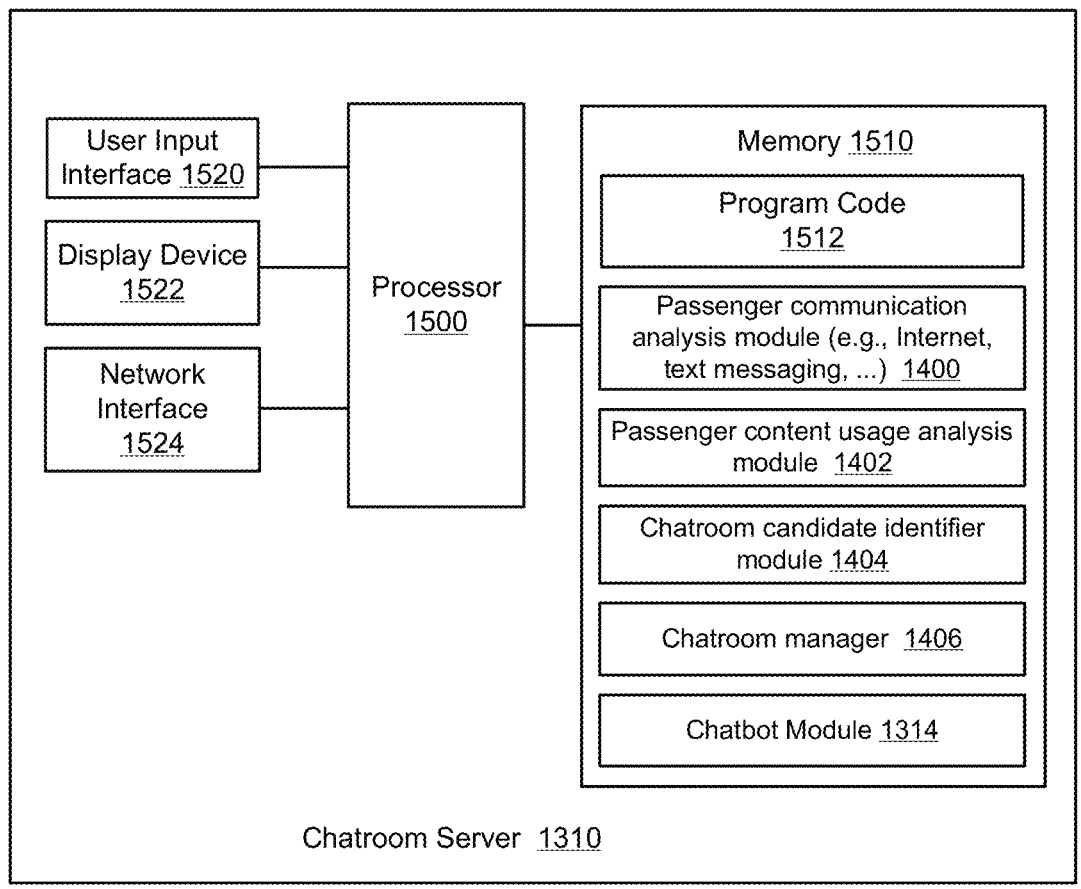
FIG. 15 is a block diagram of components that may be included in the chatroom server of FIGS. 13 and 14 and configured to operate according to some embodiments.

FIG. 15 is a block diagram of components that may be included in the chatroom server 1310 of FIGS. 13 and 14 and configured to operate according to some embodiments. One or more of the components illustrated in FIG. 15 may be included in one or more elements of the IFE system of FIG. 13, such as within the head end content server 1340 and/or the passenger terminal 1360. The chatroom server 1310 includes at least one processor 1500 ("processor") and at least one memory 1510 ("memory") containing general server program code 1512 (e.g., operating system, hypervisor, and input-output access management), the passenger communication analysis module 1400, the passenger content usage analysis module 1402, the chatroom candidate identifier module 1404, the chatroom manager 1406, and the chatbot module 1314. The processor 1500 includes one or more data processing circuits, such as a general purpose and/or special purpose processor (e.g., microprocessor and/or digital signal processor). The processor 1500 is configured to execute the code in the memory 1510, described below as a computer readable medium, to perform some or all of the operations and methods that are described herein for one or more of the embodiments. The chatroom server 1310 can include at least one user input interface 1520 (e.g., touch screen interface, switches, control wheels, buttons, keypad, keyboard, etc.), display device 1522, and at least one network interface 1524 ("network interface"). The network interface 1524 is configured to communicate through the network 1330 and the content distribution components 1320 with the passenger terminals 1360 (wired passenger terminal 1360a, PED 1360n, etc.), the head end content server 1340, the satellite radio transceiver 1350, and/or the terrestrial radio transceiver 1352.

Further Embodiments and Definitions

In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another node, it can be directly connected, coupled, or responsive to the other element or intervening element may be present. In contrast, when an element is referred to as being "directly connected", "directly coupled", "directly responsive", or variants thereof to another element, there are no intervening element present. Like numbers refer to like element throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BluRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

The invention claimed is:

1. A vehicle chatroom server comprising:
    at least one network interface configured to communicate with passenger terminals;
    at least one processor connected to communicate through the at least one network interface; and
    at least one memory storing code that is executed by the at least one processor to perform operations comprising to:
        obtain passenger information;
        characterize potential passenger discussion interests based on the passenger information;
        identify a grouping of passengers who satisfy a common interest rule based on the potential passenger discussion interests; and
        communicate with passengers in the grouping through a computerized chatbot module providing natural-language text and/or computer synthesized speech that is provided to the passengers in the grouping to invite to a discussion-focused chatroom hosted by the chatroom server.

2. The vehicle chatroom server of claim 1, wherein the operations further comprise:
    receiving responses from the passengers in the grouping through operation of the computerized chatbot module processing text responses and/or converting passengers' speech-to-text, wherein responses received from a sub-grouping of the passengers are determined to indicate acceptance of the invitation; and
    responsive to the responses, establishing communication sessions, through at least one network, between a chatroom manager performed by the vehicle chatroom server and passenger terminals that are associated with passengers in the sub-grouping.

3. The vehicle chatroom server of claim 2, wherein the operations further comprise:
    following establishment of the communication sessions, operating the chatroom manager to repeat for each message received from one of the passenger terminals of one of the passengers in the sub-grouping,
        filtering the message according to at least one chatroom rule, and selectively forwarding the filtered message to the other passenger terminals of other passengers in the sub-grouping through the at least one network.

4. The vehicle chatroom server of claim 3, wherein the operation to filter the message comprises:
    scanning the message for any words contained in a prohibited word list;
    responsive to identifying presence in the message of one of the words contained in the prohibited word list, preventing forwarding of the message to the other passenger terminals; and
    responsive to identifying no presence in the message of one of the words contained in the prohibited word list, forwarding the message to the other passenger terminals.

5. The vehicle chatroom server of claim 1, wherein the vehicle chatroom server resides at least partially off-board the aircraft such as on a ground-based server which is communicatively networked to the passenger terminals.

6. The vehicle chatroom server of claim 1, wherein the passenger information used to characterize potential passenger discussion interests comprises:
    at least one of statistical metrics based on occurrences of the identified keywords from communications performed on an application of the passenger terminal, characteristics of the identified keywords based on one or more defined rules, source addresses for the communications performed on the application of the passenger terminal, and destination addresses for the communications performed on the application of the passenger terminal.

7. The vehicle chatroom server of claim 1, wherein the passenger information used to characterize potential passenger discussion interests comprises tracking information of what content is browsed or selected for viewing by the passenger through an application of the passenger terminal.

8. The vehicle chatroom server of claim 1, wherein:
    the operation to obtain passenger information comprises processing a camera signal to generate an attentiveness metric characterizing attentiveness of the passenger while viewing content displayed on the passenger terminal; and
    the passenger information used to characterize potential passenger discussion interests comprises the attentiveness metric.

9. The vehicle chatroom server of claim 8, wherein the operation to process the camera signal to generate the attentiveness metric, comprises:
    processing the camera signal to identify how long the passenger's eyes are directed at content displayed on the passenger terminal; and generating the attentiveness metric based on how long the passenger's eyes are directed at the content displayed on the passenger terminal.

10. The vehicle chatroom server of claim 1, wherein:
the operation to obtain passenger information comprises processing a camera signal to generate an emotion metric characterizing emotional state of the passenger's face while viewing content displayed on the passenger terminal; and
the passenger information used to characterize potential passenger discussion interests comprises the emotion metric.

11. The vehicle chatroom server of claim 10, wherein operations performed on a camera comprise:
processing the camera signal to characterize features of the passenger's face as being associated with one of a plurality of defined emotional states, while the passenger is viewing content displayed on the passenger terminal; and
generating the emotion metric based on the one of the plurality of defined emotional states.

12. The vehicle chatroom server of claim 1, wherein the passenger information used to characterize potential passenger discussion interests comprises passenger demographic data.

13. The vehicle chatroom server of claim 12, wherein the passenger demographic data is determined based on at least one of performing operations on a camera signal to characterize facial features of the passenger, querying an application on the passenger terminal, and querying a ground-based server that was involved in at least one of a flight reservation process for the passenger and pre-flight passenger interfacing process.

14. The vehicle chatroom server of claim 13, wherein the operation to determine the passenger demographic data is based on performing operations on the camera signal to characterize facial features of the passenger, including processing the camera signal to characterize features of the passenger's face as being associated with one of a plurality of defined demographics, and generating the passenger demographic data based on the one of the plurality of defined demographics.

15. The vehicle chatroom server of claim 1, wherein:
the operation to obtain passenger information comprises receiving fitness data through a wireless network interface from a fitness tracking electronic device of the passenger; and
the operation to characterize potential passenger discussion interests is based on the fitness data.

16. The vehicle chatroom server of claim 1, wherein:
the operation to obtain passenger information comprises obtaining information defining a passenger itinerary; and
the operation to characterize potential passenger discussion interests is based on the passenger itinerary of the passenger.

17. The vehicle chatroom server of claim 1, wherein:
the operation to obtain passenger information comprises obtaining information characterizing a vehicle transporting the passenger; and
the operation to characterize potential passenger discussion interests is based on the information characterizing the vehicle.

18. The vehicle chatroom server of claim 1, wherein the operations further comprise to:
establish communications between the vehicle chatroom server and a plurality of passengers being transported on different vehicles;
repeat for each of the plurality of passengers being transported on the different vehicles the operations to obtain passenger information for the passenger, and characterize potential passenger discussion interests based on the passenger information;
identify a grouping of passengers from among the plurality of passengers being transported on different vehicles who satisfy a common interest rule based on the potential passenger discussion interests; and
communicate with passengers in the grouping through a computerized chatbot module providing natural-language text and/or computer synthesized speech that is provided to the passengers in the grouping to invite to a discussion-focused chatroom hosted by the chatroom server that extends between the different vehicles.

19. A method by a vehicle chatroom server comprising:
obtaining passenger information;
characterizing potential passenger discussion interests based on the passenger information;
identifying a grouping of passengers who satisfy a common interest rule based on the potential passenger discussion interests; and
communicating with passengers in the grouping through a computerized chatbot module providing natural-language text and/or computer synthesized speech that is provided to the passengers in the grouping to invite to a discussion-focused chatroom hosted by the chatroom server.

20. A computer program product comprising:
a non-transitory computer readable medium storing program instructions executable by a processor of a vehicle chatroom server to perform operations to:
characterize potential passenger discussion interests based on the passenger information;
identify a grouping of passengers who satisfy a common interest rule based on the potential passenger discussion interests; and
communicate with passengers in the grouping through a computerized chatbot module providing natural-language text and/or computer synthesized speech that is provided to the passengers in the grouping to invite to a discussion-focused chatroom hosted by the chatroom server.

* * * * *